(12) United States Patent
Johnson et al.

(10) Patent No.: US 8,970,654 B1
(45) Date of Patent: Mar. 3, 2015

(54) SYSTEM AND METHOD FOR SELECTING PORTIONS OF VIDEO DATA FOR HIGH QUALITY FEED WHILE CONTINUING A LOW QUALITY FEED

(75) Inventors: Alexander Steven Johnson, Erie, CO (US); Marc-Antoine Lamontagne, St-Eustache (CA); Mark Whiffen, Kirkland (CA)

(73) Assignee: Verint Systems Inc., Santa Clara, CA (US)

( * ) Notice: Subject to any disclaimer, the term of this patent is extended or adjusted under 35 U.S.C. 154(b) by 960 days.

(21) Appl. No.: 12/640,866

(22) Filed: Dec. 17, 2009

Related U.S. Application Data

(60) Provisional application No. 61/139,782, filed on Dec. 22, 2008.

(51) Int. Cl.
*H04N 7/14* (2006.01)
(52) U.S. Cl.
USPC .......................................................... 348/14.07
(58) Field of Classification Search
CPC .............................. H04N 5/232; H04N 7/181
USPC ............... 348/207.99, 14.07, 14.08; 725/146; 375/240.27
See application file for complete search history.

(56) References Cited

U.S. PATENT DOCUMENTS

| | | | |
|---|---|---|---|
| 2002/0051058 A1* | 5/2002 | Ito et al. | 348/152 |
| 2002/0135483 A1* | 9/2002 | Merheim et al. | 340/573.1 |
| 2005/0169367 A1* | 8/2005 | Venetianer et al. | 375/240.01 |
| 2007/0039032 A1* | 2/2007 | Goldey et al. | 725/114 |
| 2009/0070675 A1* | 3/2009 | Li | 715/716 |
| 2009/0085740 A1* | 4/2009 | Klein et al. | 340/540 |

* cited by examiner

*Primary Examiner* — Mekonnen Dagnew
(74) *Attorney, Agent, or Firm* — Meunier Carlin & Curfman

(57) ABSTRACT

A method for operating a video system is provided. The method includes receiving video data comprising a scene from a video capture device at a video processor, and processing the video data to produce first video data of the scene at a first quality level in the video processor. The method continues by transferring the first video data at a first data rate from the video processor to a remote video processor, receiving a control signal, and processing the video data to produce second video data of the scene at a second quality level in response to the control signal in the video processor, where the second quality level is greater than the first quality level. The method concludes by transferring the second video data at a second data rate from the video processor to the remote video processor.

20 Claims, 6 Drawing Sheets

SYSTEM AND METHOD FOR SELECTING PORTIONS OF VIDEO DATA FOR HIGH QUALITY FEED WHILE CONTINUING A LOW QUALITY FEED

RELATED APPLICATIONS

This application relates to and claims priority to U.S. Patent Application No. 61/139,782, filed on Dec. 22, 2008, entitled SYSTEM AND METHOD FOR SELECTING PORTIONS OF VIDEO DATA FOR HIGH QUALITY FEED WHILE CONTINUING A LOW QUALITY FEED, and which is hereby incorporated by reference in its entirety.

TECHNICAL FIELD

Aspects of this invention are related in general to the field of video analytics. In particular, aspects of this invention are related to the selection of video data for high quality feed while continuing to transmit a low quality video feed.

TECHNICAL BACKGROUND

Some current video systems include provisions for the remote display and processing of video data received from a video capture device. For example, a security system may include a number of video capture devices all connected to a local video processing system. If someone at a remote site wishes to monitor the security system, video data may be transmitted to a remote video processing system at the remote site for display. Often the link to the remote video processing system has bandwidth constraints. In such cases, the local video processing system may process the video data into a low quality video feed for transmission to the remote site in order to conserve bandwidth.

This low quality video feed may be sufficient for use at the remote site most of the time. However, there may be occasions when the remote site requires higher quality video data than it is currently being provided. Higher quality video data may be recorded at the local site and later transferred to the remote site by use of a DVD or other media, transmitted over a separate high-bandwidth link, or transferred using other similar methods. When transferred by DVD or other video media, a significant cost and delay may be incurred. Separate high-bandwidth links may also be very expensive, and may not always be available for use.

OVERVIEW

A method for operating a video system is provided. The method includes receiving video data comprising a scene from a video capture device at a video processor, and processing the video data to produce first video data of the scene at a first quality level in the video processor. The method continues by transferring the first video data at a first data rate from the video processor to a remote video processor, receiving a control signal, and processing the video data to produce second video data of the scene at a second quality level in response to the control signal in the video processor, where the second quality level is greater than the first quality level. The method concludes by transferring the second video data at a second data rate from the video processor to the remote video processor.

In another embodiment, the method includes receiving the first video data from the video processor at the remote video processor and transferring the first video data from the remote video processor for display. The method also includes receiving the second video data from the video processor at the remote video processor in response to the control signal, and transferring the second video data from the remote video processor for display.

In another embodiment, the method displays the first video data in real-time, and stores the second video data in a buffer. In a further embodiment, transmitting the control signal from the remote video processor to the video processor is initiated by a user.

In another embodiment the method includes processing at least a portion of the first video data to determine an occurrence of an event, and transmitting the control signal to the video processor in response to the occurrence of the event.

In a further embodiment, the event is motion within the scene. In another embodiment, the event is a presence of an object of interest within the scene. In another embodiment, the second video data is differential video data configured such that it may be combined with the first video data to produce third video data at a third quality level, where the third quality level is greater than the first quality level.

In a further embodiment, the first quality level is a first scale, the second quality level is a second scale, and the first scale is greater than the second scale. In another embodiment, the first quality level is a first frame rate, the second quality level is a second frame rate, and the second frame rate is greater than the first frame rate.

In another embodiment, a video system including a video capture device configured to capture video data of a scene, a video processor communicatively coupled with the video capture device, and a remote video processor communicatively coupled with the video processor is provided. The remote video processor is configured to receive first video data from the video processor. The first video data includes the scene at a first quality level and is received at a first data rate. The remote video processor is also configured to transfer the first video data for display, and to transmit a control signal to the video processor. The remote video processor is further configured to receive second video data from the video processor in response to the control signal, where the second video data includes the scene at a second quality level and is received at a second data rate, and to transfer the second video data for display.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
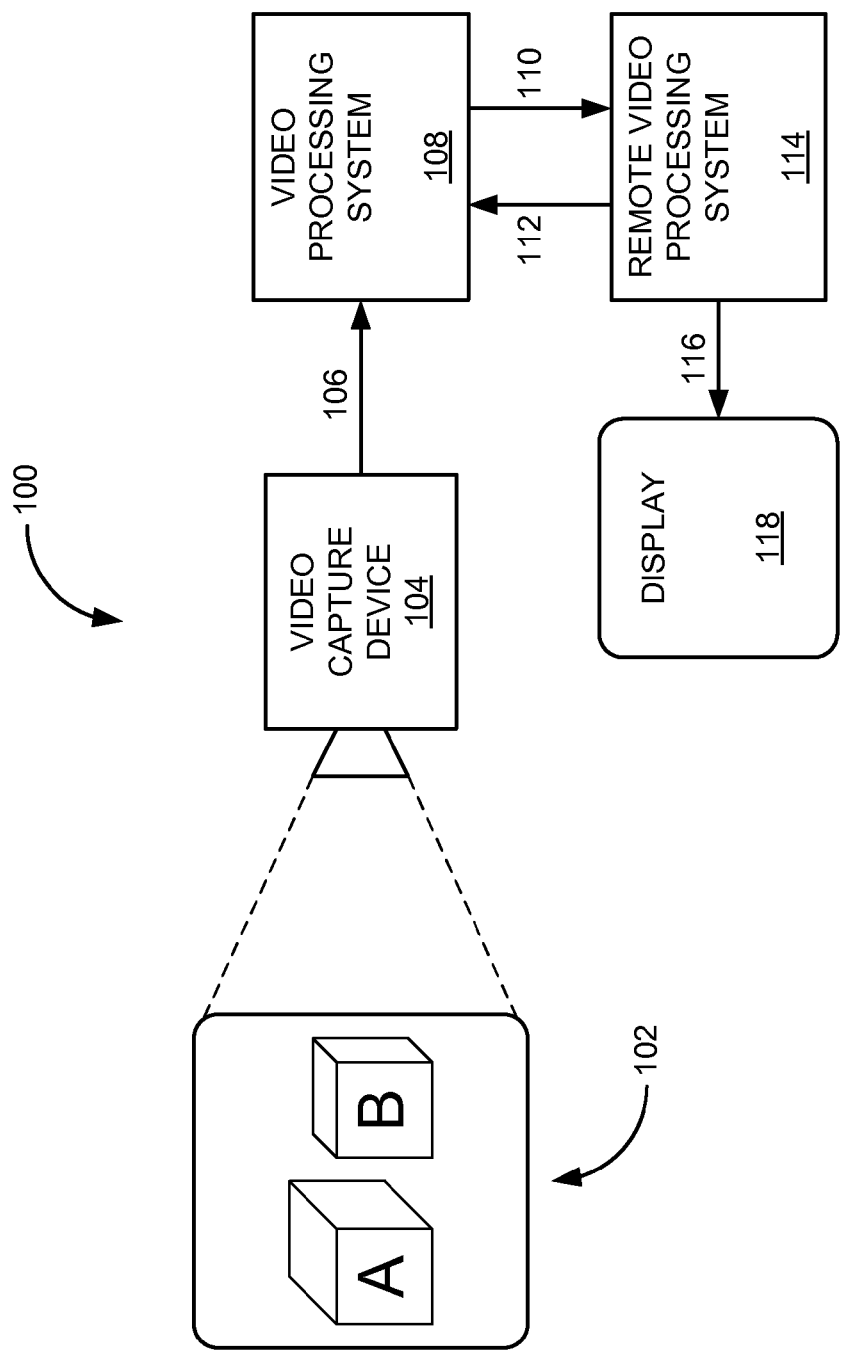
FIG. 1 is a block diagram illustrating a video system for selecting portions of video data for high quality feed while continuing a low quality feed.

FIG. 1 is a block diagram illustrating a video system for selecting portions of video data for high quality feed while continuing a low quality feed. In this example, a video system includes video capture device 104 configured to capture video data of scene 102, video processing system 108, remote video processing system 114, and display 118. Video capture system is coupled with video processing system through link 106. Video processing system 108 is coupled with remote video processing system 114 through link 110 and link 112. Display 118 is coupled with remote video processing system 114 through link 116.

Video capture device 104 may be a digital camera or any other device capable of capturing video data from scene 102. Video processing system 108 may be any computer system, custom hardware, or other device configured to receive, process, and transmit video data. Likewise, remote video processing system 114 may be any computer system, custom hardware, or other device configured to receive, process, and transmit video data. Display 118 may be any device capable of displaying one or more video data stream to a user.

Links 106, 110, 112, and 116 may use any of a variety of communication media, such as air, metal, optical fiber, or any other signal propagation path, including combinations thereof. Also, links 106, 110, 112, and 116 may use any of a variety of communication protocols, such as internet, telephony, optical networking, wireless communication, wireless fidelity, or any other communication protocols and formats, including combinations thereof. Further, links 106, 110, 112, and 116 could be direct links or they might include various intermediate components, systems, and networks.

In this example, scene 102 includes a view of two objects; object A and object B. Normal scenes may be much more complicated than the simple scene 102 used here for illustration purposes. Video capture device 104 captures video data of scene 102 and sends it to video processing system 108 over link 106. Video processing system 108 receives the video data from video capture device 104 and processes it to produce video data of scene 102 at a low quality. This low quality level allows the video data to be sent to a remote device using a minimal amount of bandwidth. This is generally sufficient if the scene is stationary or if nothing of interest is occurring within the scene. However, when a significant event occurs within the scene it may be desirable to send high quality video data to the remote device.

In the example illustrated in FIG. 1, when remote video processing system 114 detects an event occurring within scene 102 that is significant, it sends a control signal to video processing system 108 through link 112 instructing video processing system 108 to start producing a high quality video of scene 102 for transmission to remote video processing system 114. This high resolution video may be sent to remote processing system 114 over link 110 at a less than real-time rate in order to minimize usage of the bandwidth of link 110. While this high quality video is being generated and transmitted by video processing system 108, the low quality video is continually sent at a real-time rate to remote video processing system 114 over link 110.

Display 118 may be configured to receive both the high and low quality video data from remote video processing system 114 and to display one or both of the video data streams. Remote video processing system 114 may contain a buffer allowing it to store the high quality video data as it arrives in a non-real-time rate, and later send it to display 118 for display at a real-time rate.

The control signal sent to video processing system 108 over link 112 may be triggered in any of a variety of methods. For example, a user monitoring the low resolution video on display 118 may decide to start a high quality feed and trigger the sending of the control signal. Other examples may include video analytics within remote video processing system 114 able to automatically detect the occurrence of an event within the low quality video and trigger the control signal in response to the detection of the event. Still other examples may include video analytics within video processing system 108 able to automatically detect the occurrence of an event within the low quality video and trigger a control signal within itself to start the generation of high quality video.

When the event is over, it may be desirable to send a second control signal to video processing system 108 to end the generation of high quality video data. In some examples, this may stop the generation of high quality video, but any high quality video that has previously been generated but not yet transferred to remote video processing system 114 may continue to transfer at a non-real-time rate over link 110 to remote video processing system 114.

In some embodiments, it may advantageous to send video data making up the difference between the low quality video and the high quality video. In such an embodiment this differential video data would then be combined with the low quality video data to produce high quality video. This saves bandwidth in that the differential video data may be smaller than the high quality video data.

Video data received from video capture device 104 will have an initial size commonly measured in pixels. For example, a video capture system may capture video at a size of 3000×2000 pixels. In some embodiments, this video may be scaled at 2:1 to a size of 1500×1000 pixels or scaled at 4:1 to a size of 750×500 pixels for display on devices having various quantities of pixels. The high quality video may be transmitted at a scale (or compression level) of 2:1 while the low quality video may be transmitted at a scale (or compression level) of 4:1. Thus the low quality video has a greater scale or compression level than the high quality video.

Figure 2:
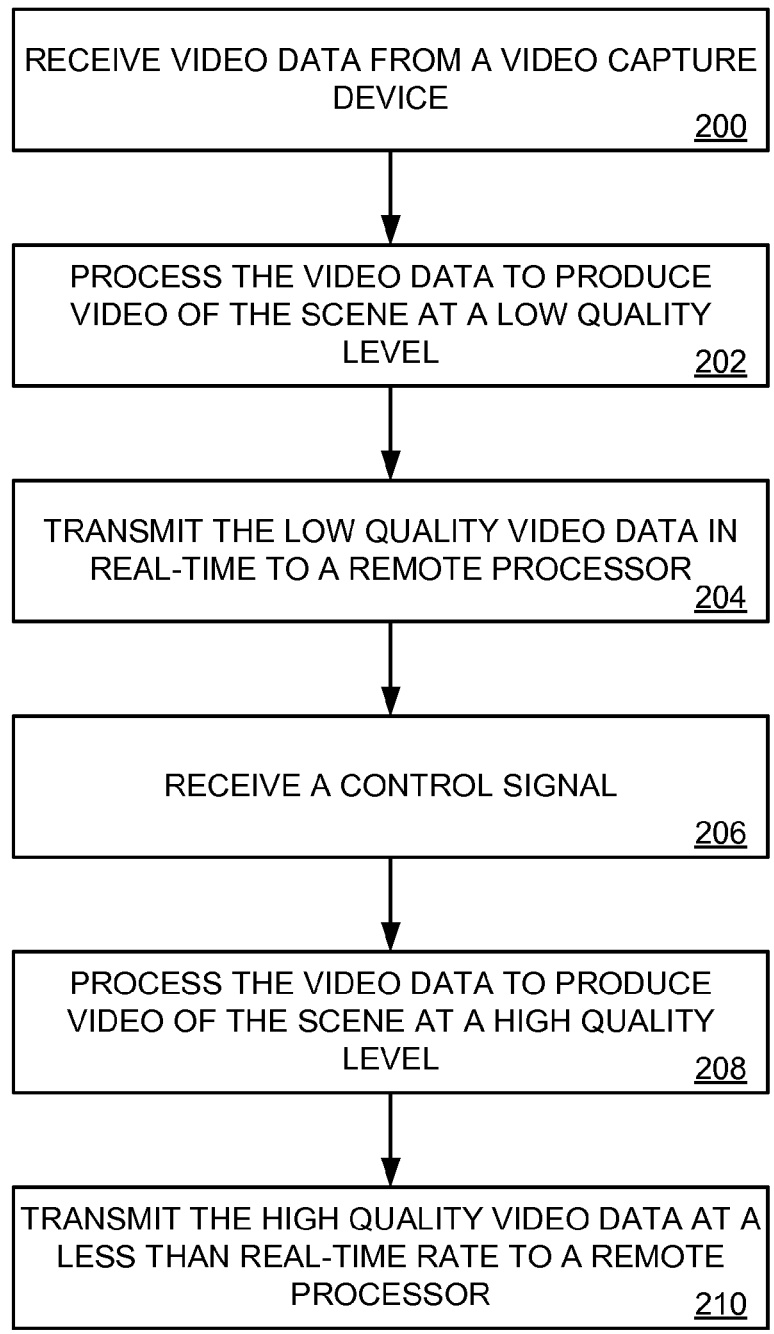
FIG. 2 is a block diagram illustrating a method for selecting portions of video data for high quality feed while continuing a low quality feed.

FIG. 2 is a block diagram illustrating a method for selecting portions of video data for high quality feed while continuing a low quality feed. In this example, video processing system 108 receives video data from video capture device 104 over link 106 (operation 200). This video data may be received in real-time in any of a wide variety of video formats.

Video processing system 108 processes the video data to produce video of the scene at a low quality level (operation 202). Video processing system 108 then transmits the low quality video data at a real-time rate to remote video processing system 114 over link 110 (operation 204).

At some point in time, video processing system 108 receives a control signal (operation 206). This control signal may arrive from remote video processing system 114 over link 112, or in some examples, may be generated internally within video processing system 108. In response to the control signal, video processing system 108 begins processing the video data to produce video of the scene at a high quality level in addition to producing video of the scene at the low quality level (operation 208).

Quality levels may be determined in any of a wide variety of ways and may include any of a variety of different manifestations of quality. For example, low quality video may be video that has a high scale or compression level, while high quality video has a much lower scale or compression level. In other examples, low quality video may have a different color map than high quality video, as in the case where low quality video is transmitted in black and white, while high quality video is transmitted in color. Still other examples may include low quality video having a low frame rate, while high quality video has a higher frame rate. In some embodiments multiple manifestations of quality may be used within a single system. For example, high quality video may have both a higher frame rate and a lower compression ratio that low quality video.

Figure 3:
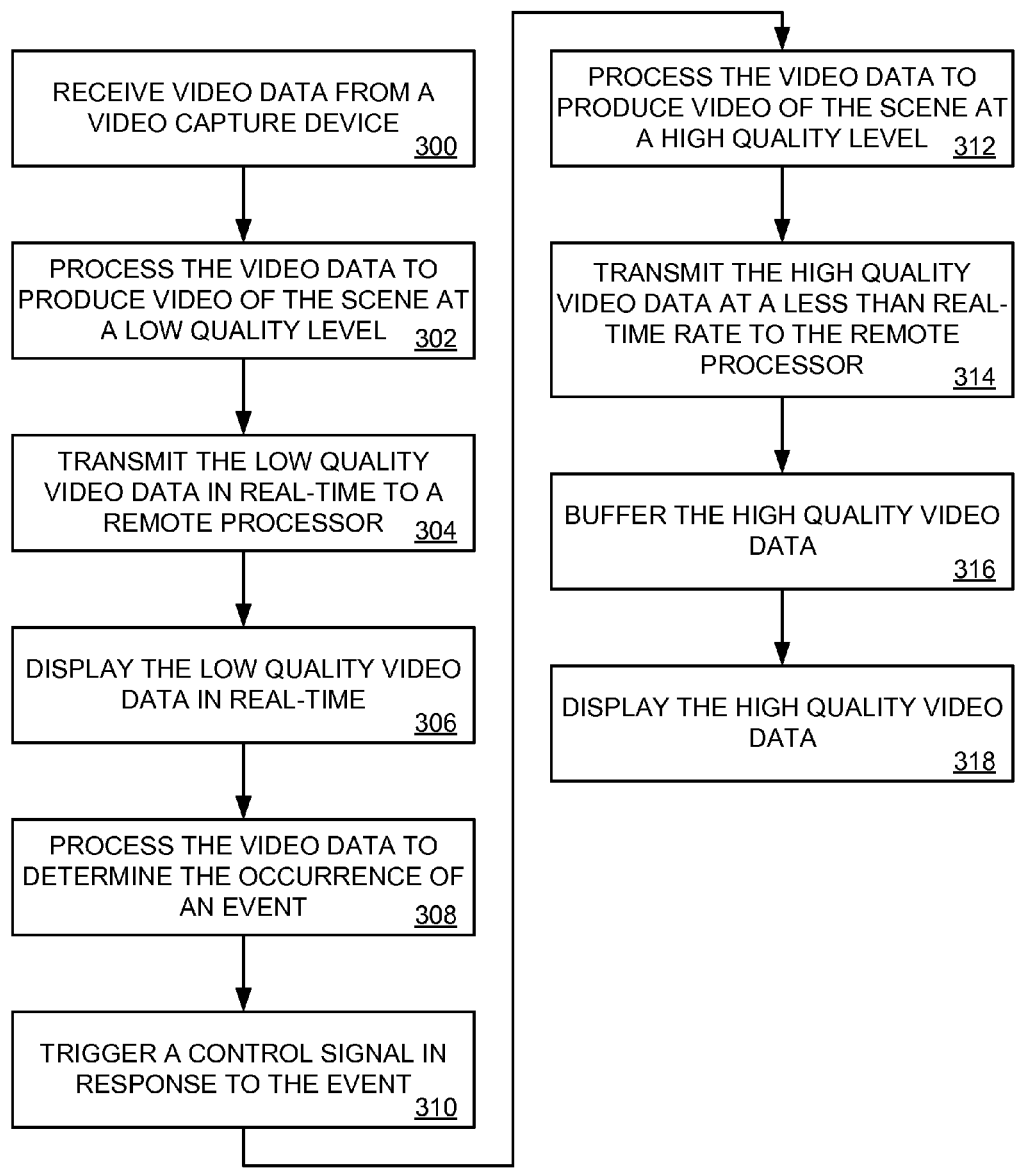
FIG. 3 is a block diagram illustrating a method for selecting portions of video data for high quality feed while continuing a low quality feed.

FIG. 3 is a block diagram illustrating a method for selecting portions of video data for high quality feed while continuing a low quality feed. In this example, video processing system 108 receives video data from video capture device 104 over link 106 (operation 300). This video data may be received in real-time in any of a wide variety of video formats.

Video processing system 108 processes the video data to produce video of the scene at a low quality level (operation 302). Video processing system 108 then transmits the low quality video data at a real-time rate to remote video processing system 114 over link 110 (operation 304). Display 118 displays the low quality video data in real-time (operation 306).

Remote processing system 114 processes the video data to determine the occurrence of an event (operation 308). This processing may alternatively occur in video processing system 108. The event may be any of a wide variety of events capable of detection in video data of scene 102. For example, the event may be motion within scene 102, the presence of an object of interest within scene 102, the absence of an object of interest within scene 102, or any other event capable of being detected. The object of interest may be anything detectable in the video such as a human, car, boat, dog, cat, or the like.

In response to the detection of the occurrence of the event, a control signal is triggered (operation 310). This control signal may arrive from remote video processing system 114 over link 112, or in some examples, may be generated internally within video processing system 108. In response to the control signal, video processing system 108 begins processing the video data to produce video of the scene at a high quality level in addition to producing video of the scene at the low quality level (operation 312).

Quality levels may be determined in any of a wide variety of ways and may include any of a variety of different manifestations of quality. For example, low quality video may be video that has a high scale or compression level, while high quality video has a much lower scale or compression level. In other examples, low quality video may have a different color map than high quality video, as in the case where low quality video is transmitted in black and white, while high quality video is transmitted in color. Still other examples may include low quality video having a low frame rate, while high quality video has a higher frame rate. In some embodiments multiple manifestations of quality may be used within a single system. For example, high quality video may have both a higher frame rate and a lower compression ratio that low quality video.

Video processing system 108 transmits the high quality video data at a non-real-time rate to remote video processing system 114 (operation 314). Since the high quality video is received at a non-real-time rate, remote video processing system 114 buffers the high quality video data (operation 316) for later display (operation 318). The high quality video data may be displayed later at a real-time rate or any other desired rate.

Figure 4:
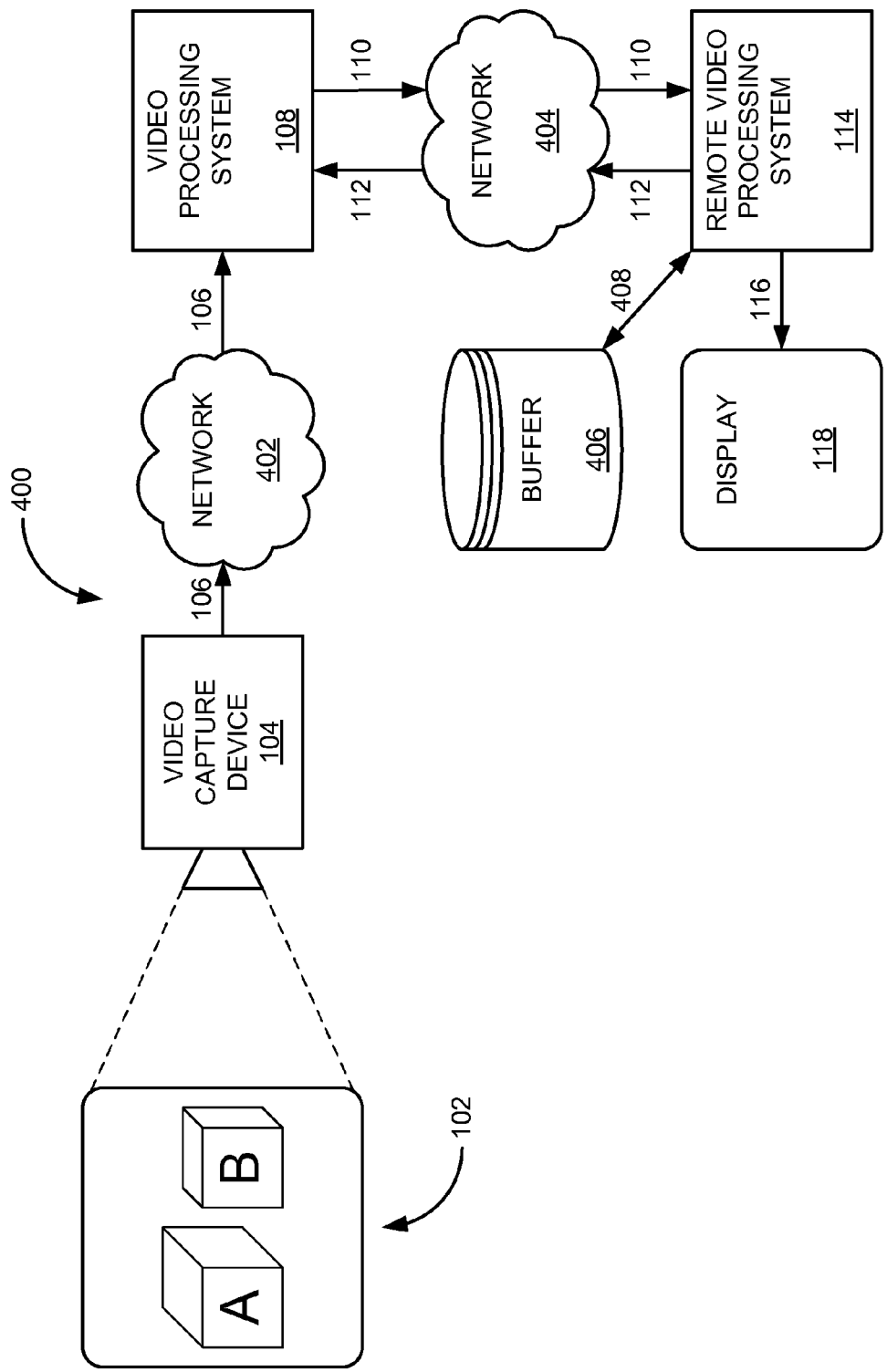
FIG. 4 is a block diagram illustrating a video system for selecting portions of video data for high quality feed while continuing a low quality feed.

FIG. 4 is a block diagram illustrating a video system for selecting portions of video data for high quality feed while continuing a low quality feed. In this example, a video system includes video capture device 104 configured to capture video data of scene 102, video processing system 108, remote video processing system 114, buffer 406, and display 118. Video capture device 104 is coupled with video processing system 108 through link 106. Video processing system 108 is coupled with remote video processing system 114 through link 110 and link 112. Display 118 is coupled with remote video processing system 114 through link 116. Buffer 406 is coupled with remote video processing system 114 through link 408.

Video capture device 104 may be a digital camera or any other device capable of capturing video data from scene 102. Video processing system 108 may be any computer system, custom hardware, or other device configured to receive, process, and transmit video data. Likewise, remote video processing system 114 may be any computer system, custom hardware, or other device configured to receive, process, and transmit video data. Display 118 may be any device capable of displaying one or more video data stream to a user.

Links 106, 110, 112, 116, and 408 may use any of a variety of communication media, such as air, metal, optical fiber, or any other signal propagation path, including combinations thereof. Also, links 106, 110, 112, 116, and 408 may use any of a variety of communication protocols, such as internet, telephony, optical networking, wireless communication, wireless fidelity, or any other communication protocols and formats, including combinations thereof. Further, links 106, 110, 112, 116, and 408 could be direct links or they might include various intermediate components, systems, and networks. In this example, link 106 includes network 402, and links 110 and 112 include network 404.

In this example, scene 102 includes a view of two objects: object A and object B. Normal scenes may be much more complicated than the simple scene 102 used here for illustration purposes. Video capture device 104 captures video data of scene 102 and sends it to video processing system 108 over link 106. Video processing system 108 receives the video data from video capture device 104 and processes it to produce video data of scene 102 at a low quality. This low quality level allows the video data to be sent to a remote device using a minimal amount of bandwidth. This is generally sufficient if the scene is stationary or if nothing of interest is occurring within the scene. However, when a significant event occurs within the scene it may be desirable to send high quality video data to the remote device.

In the example illustrated in FIG. 4, when remote video processing system 114 detects a significant event occurring within scene 102, it sends a control signal to video processing system 108 through link 112 instructing video processing system 108 to start producing a high quality video of scene 102 for transmission to remote video processing system 114. This high resolution video may be sent to remote processing system 114 over link 110 at a less than real-time rate in order to minimize usage of the bandwidth of link 110. While this high quality video is being generated and transmitted by video processing system 108, the low quality video is continually sent at a real-time rate to remote video processing system 114 over link 110. The high quality video is stored in buffer 406 for display at a real-time or other rate on display 118.

Display 118 may be configured to receive both the high and low quality video data from remote video processing system 114 and to display one or both of the video data streams. Remote video processing system 114 uses buffer 406 to store the high quality video data as it arrives in a non-real-time rate, and later send it to display 118 for display at a real-time (or non-real-time) rate.

The control signal sent to video processing system 108 over link 112 may be triggered in any of a variety of methods. For example, a user monitoring the low resolution video on display 118 may decide to start a high quality feed and trigger the sending of the control signal. Other examples may include video analytics within remote video processing system 114 able to automatically detect the occurrence of an event within the low quality video and trigger the control signal in response to the detection of the event. Still other examples may include video analytics within video processing system 108 able to automatically detect the occurrence of an event within the low quality video and trigger an internal control signal to start the generation of high quality video.

When the event is over, it may be desirable to send a second control signal to video processing system 108 to end the generation of high quality video data. In some examples, this may stop the generation of high quality video, but any high quality video that has previously been generated but not yet transferred to remote video processing system 114 may continue to transfer at a non-real-time rate over link 110 to remote video processing system 114. Other examples may include video analytics within remote video processing system 114 able to automatically detect the end of an event within the low quality video and trigger the second control signal in response to the detection of the end of the event. Still other examples may include video analytics within video processing system 108 able to automatically detect the end of an event within the low quality video and trigger an internal control signal to stop the generation of high quality video.

Figure 5:
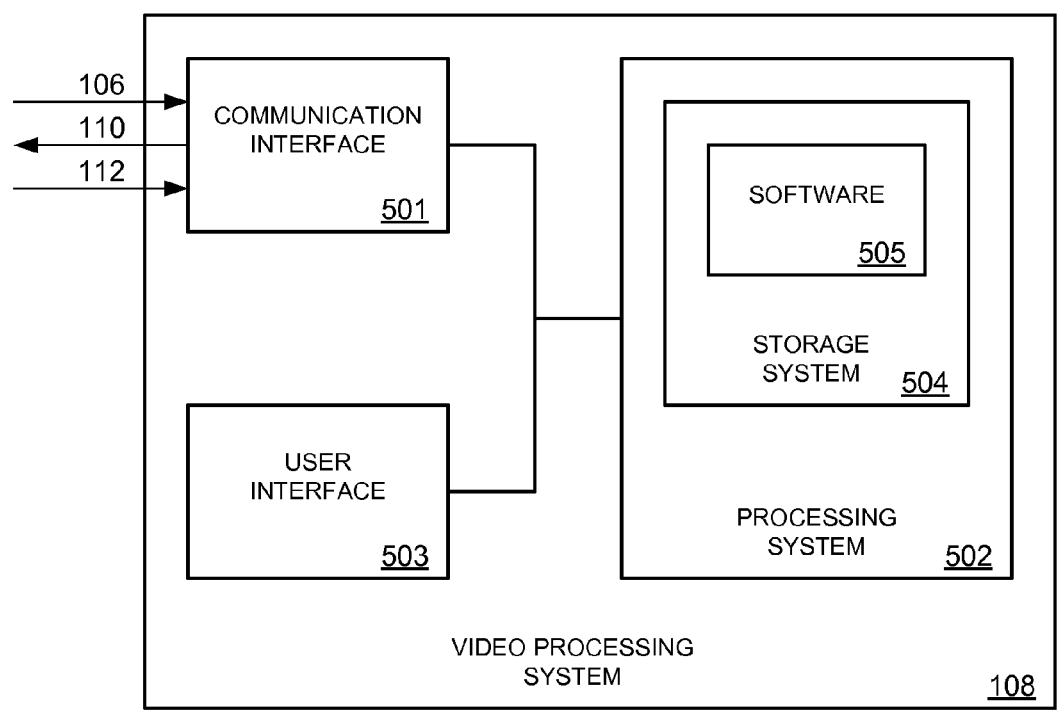
FIG. 5 is a block diagram illustrating a video processing system configured to select portions of video data for high quality feed while continuing a low quality feed.

FIG. 5 is a block diagram illustrating a video processing system configured to select portions of video data for high quality feed while continuing a low quality feed. Video processing system 108 includes communication interface 501, processing system 502, and user interface 503. Processing system 502 includes storage system 504. Storage system 504 stores software 505. Processing system 502 is linked to communication interface 501 and user interface 503. Video processing system 108 could include a programmed general-purpose computer, although those skilled in the art will appreciate that programmable or special purpose circuitry and equipment may be used. Video processing system 108 may be distributed among multiple devices that together make up elements 501-505.

Communication interface 501 could include a network interface, modem, port, transceiver, or some other communication device. Communication interface 501 may be distributed among multiple communication devices. Communication interface 501 may be configured to receive video from video capture device 102 over link 106. Communication interface 501 may also be configured to transmit video data to remote video processing system 114 over link 110, and to receive control signals over link 112. Processing system 502 could include a computer microprocessor, logic circuit, or some other processing device. Processing system 502 may be distributed among multiple processing devices. User interface 503 could include a keyboard, mouse, voice recognition interface, microphone and speakers, graphical display, touch screen, or some other type of user device. User interface 503 may be distributed among multiple user devices. Storage system 504 could include a disk, tape, integrated circuit, server, or some other memory device. Storage system 504 may be distributed among multiple memory devices. Storage system 504 may be configured to operate as database 106.

Processing system 502 retrieves and executes software 505 from storage system 504. Software 505 may include an operating system, utilities, drivers, networking software, and other software typically loaded onto a computer system. Software 505 could include an application program, firmware, or some other form of machine-readable processing instructions. When executed by processing system 502, software 505 directs processing system 502 to operate as described herein.

Figure 6:
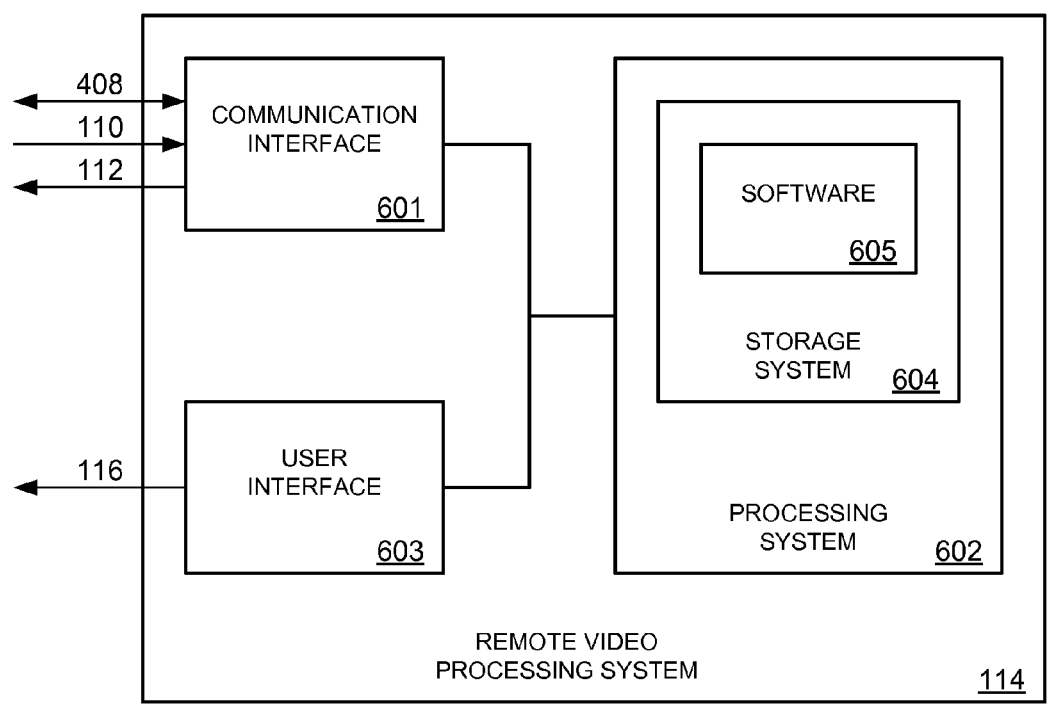
FIG. 6 is a block diagram illustrating a remote video processing system configured to select portions of video data for high quality feed while continuing a low quality feed.

FIG. 6 is a block diagram illustrating a remote video processing system configured to select portions of video data for high quality feed while continuing a low quality feed. Remote video processing system 114 includes communication interface 601, processing system 602, and user interface 603. Processing system 602 includes storage system 604. Storage system 604 stores software 605. Processing system 602 is linked to communication interface 601 and user interface 603. Remote video processing system 114 could include a programmed general-purpose computer, although those skilled in the art will appreciate that programmable or special purpose circuitry and equipment may be used. Remote video processing system 114 may be distributed among multiple devices that together make up elements 601-605.

Communication interface 601 could include a network interface, modem, port, transceiver, or some other communication device. Communication interface 601 may be distributed among multiple communication devices. Communication interface 601 may be configured to receive video data from video processing system 108 over link 110, send control signals to video processing system 108 over link 112, and to store video data in buffer 406 through link 408. Processing system 602 could include a computer microprocessor, logic circuit, or some other processing device. Processing system 602 may be distributed among multiple processing devices. User interface 603 could include a keyboard, mouse, voice recognition interface, microphone and speakers, graphical display, touch screen, or some other type of user device. User interface 603 may be configured to send video data to display 118 over link 116. User interface 603 may be distributed among multiple user devices. Storage system 604 could include a disk, tape, integrated circuit, server, or some other memory device. Storage system 604 may be distributed among multiple memory devices. Storage system 604 may be configured to operate as database 106.

Processing system 602 retrieves and executes software 605 from storage system 604. Software 605 may include an operating system, utilities, drivers, networking software, and other software typically loaded onto a computer system. Software 605 could include an application program, firmware, or some other form of machine-readable processing instructions. When executed by processing system 602, software 605 directs processing system 602 to operate as described herein.

One should note that the flowcharts included herein show the architecture, functionality, and/or operation of a possible implementation of software. In this regard, each block can be interpreted to represent a module, segment, or portion of code, which includes one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured media.

It should be emphasized that the above-described embodiments are merely possible examples of implementations, merely set forth for a clear understanding of the principles of this disclosure. Many variations and modifications may be made to the above-described embodiments without departing substantially from the principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a video system, the method comprising:
   in a video processor, receiving video data comprising a scene from a video capture device;
   in the video processor, processing the video data to produce first video data of the scene at a first quality level;
   transferring the first video data at a first data rate from the video processor to a remote video processor;
   in the video processor, receiving a control signal, and processing the video data to produce second video data of the scene at a second quality level in response to the control signal, wherein the second quality level is greater than the first quality level, wherein video analytics within the video processor automatically detects the occurrence of an event within first quality video and triggers a control signal within itself to start the generation of second quality level video; and
   transferring the second video data at a second data rate from the video processor to the remote video processor, while continuing to transfer the first video data at the first data rate;
   transmitting a second control signal to the video processing system to automatically end the generation of high quality video data.

2. The method of claim 1, further comprising:
   in the remote video processor, receiving the first video data from the video processor;
   transferring the first video data from the remote video processor for display;
   transmitting the control signal from the remote video processor to the video processor;
   in the remote video processor, receiving the second video data from the video processor in response to the control signal; and
   transferring the second video data from the remote video processor for display.

3. The method of claim 2, further comprising:
   displaying the first video data in real-time; and
   storing the second video data in a buffer.

4. The method of claim 2, wherein transmitting the control signal from the remote video processor to the video processor is initiated by a user.

5. The method of claim 1, further comprising:
   processing at least a portion of the first video data to determine an occurrence of an event; and
   transmitting the control signal to the video processor in response to the occurrence of the event.

6. The method of claim 5, wherein the event is motion within the scene.

7. The method of claim 5, wherein the event is a presence of an object of interest within the scene.

8. The method of claim 1, wherein the second video data is differential video data configured such that it may be combined with the first video data to produce third video data at a third quality level, wherein the third quality level is greater than the first quality level.

9. The method of claim 1, wherein the first quality level comprises a first scale, the second quality level comprises a second scale, and the first scale is greater than the second scale.

10. The method of claim 1, wherein the first quality level comprises a first frame rate, the second quality level comprises a second frame rate, and the second frame rate is greater than the first frame rate.

11. A video system comprising:
   a video capture device configured to capture video data comprising a scene;
   a video processor communicatively coupled with the video capture device; and
   a remote video processor communicatively coupled with the video processor, the remote video processor configured to:

receive first video data from the video processor, wherein the first video data comprises the scene at a first quality level and is received at a first data rate;

transfer the first video data for display;

transmit a control signal to the video processor; wherein video analytics within the video processor automatically detects the occurrence of an event within first quality video and triggers a control signal within itself to start the generation of second quality level video;

transfer the second video data for display; and transmit a second control signal to the video processing system to automatically end the generation of high quality video data.

12. The video system of claim 11, wherein the video processor is configured to:

receive the video data comprising the scene from the video capture device;

process the video data to produce the first video data at the first quality level;

transfer the first video data to the remote video processor at the first data rate;

receive the control signal;

process the video data to produce the second video data at the second quality level in response to the control signal, wherein the second quality level is greater than the first quality level; and transfer the second video data to the remote video processor at the second data rate.

13. The video system of claim 12, wherein the video processor is also configured to:

process at least a portion of the video data to determine an occurrence of an event;

process the video data to produce third video data of the scene at a third quality level in response to the occurrence of the event, wherein the third quality is greater than the first quality; and transfer the third video data to the remote video processor at a third data rate.

14. The video system of claim 13, wherein the event is motion within the scene.

15. The video system of claim 13, wherein the event is a presence of an object of interest within the scene.

16. The video system of claim 11, wherein the second video data is differential video data configured such that it may be combined with the first video data to produce third video data at a third quality level, wherein the third quality level is greater than the first quality level.

17. The video system of claim 11, wherein the first quality level comprises a first scale, the second quality level comprises a second scale, and the first scale is greater than the second scale.

18. The video system of claim 11, wherein the first quality level comprises a first frame rate, the second quality level comprises a second frame rate, and the second frame rate is greater than the first frame rate.

19. A non-transitory computer-readable medium having instructions stored thereon for operating a video system, wherein the instructions, when executed by the video system, direct the video system to:

receive video data comprising a scene from a video capture device at a video processor;

process the video data to produce first video data of the scene at a first quality level in the video processor;

transfer the first video data at a first data rate from the video processor to a remote video processor;

receive a control signal;

process the video data to produce second video data of the scene at a second quality level in response to the control signal in the video processor, wherein the second quality level is greater than the first quality level wherein video analytics within the video processor automatically detects the occurrence of an event within first quality video and triggers a control signal within itself to start the generation of second quality level video; and transfer the second video data at a second data rate from the video processor to the remote video processor, while continuing to transfer the first video data at the first data rate; and transmit a second control signal to the video processing system to automatically end the generation of high quality video data.

20. The non-transitory computer-readable medium of claim 19, wherein the instructions, when executed by the video system, further direct the video system to:

receive the first video data from the video processor at the remote video processor;

transfer the first video data from the remote video processor for display;

transmit the control signal from the remote video processor to the video processor;

receive the second video data from the video processor at the remote video processor in response to the control signal; and transfer the second video data from the remote video processor for display.

* * * * *